Sept. 5, 1950 J. S. CHEMEL 2,521,150

SOUND MOTION-PICTURE PROJECTION APPARATUS

Filed May 27, 1946 14 Sheets-Sheet 1

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 2

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 3

INVENTOR
JOSEPH S. CHEMEL
BY Fred Gerlach
ATTORNEY

SOUND MOTION-PICTURE PROJECTION APPARATUS

Filed May 27, 1946 14 Sheets-Sheet 4

INVENTOR
JOSEPH S. CHEMEL
BY Fred Gerlach
ATTORNEY

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 6

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 7

INVENTOR
JOSEPH S. CHEMEL
BY Fred Gerlach
ATTORNEY

SOUND MOTION-PICTURE PROJECTION APPARATUS

Filed May 27, 1946 14 Sheets-Sheet 8

INVENTOR
JOSEPH S. CHEMEL
BY Fred Gerlach
ATTORNEY

SOUND MOTION-PICTURE PROJECTION APPARATUS

Filed May 27, 1946 14 Sheets-Sheet 9

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 10

INVENTOR
JOSEPH S. CHEMEL
BY Fred Gerlach
ATTORNEY

Sept. 5, 1950 J. S. CHEMEL 2,521,150

SOUND MOTION-PICTURE PROJECTION APPARATUS

Filed May 27, 1946 14 Sheets-Sheet 11

INVENTOR
JOSEPH S. CHEMEL
BY Fred Gerlach
ATTORNEY

SOUND MOTION-PICTURE PROJECTION APPARATUS
Filed May 27, 1946
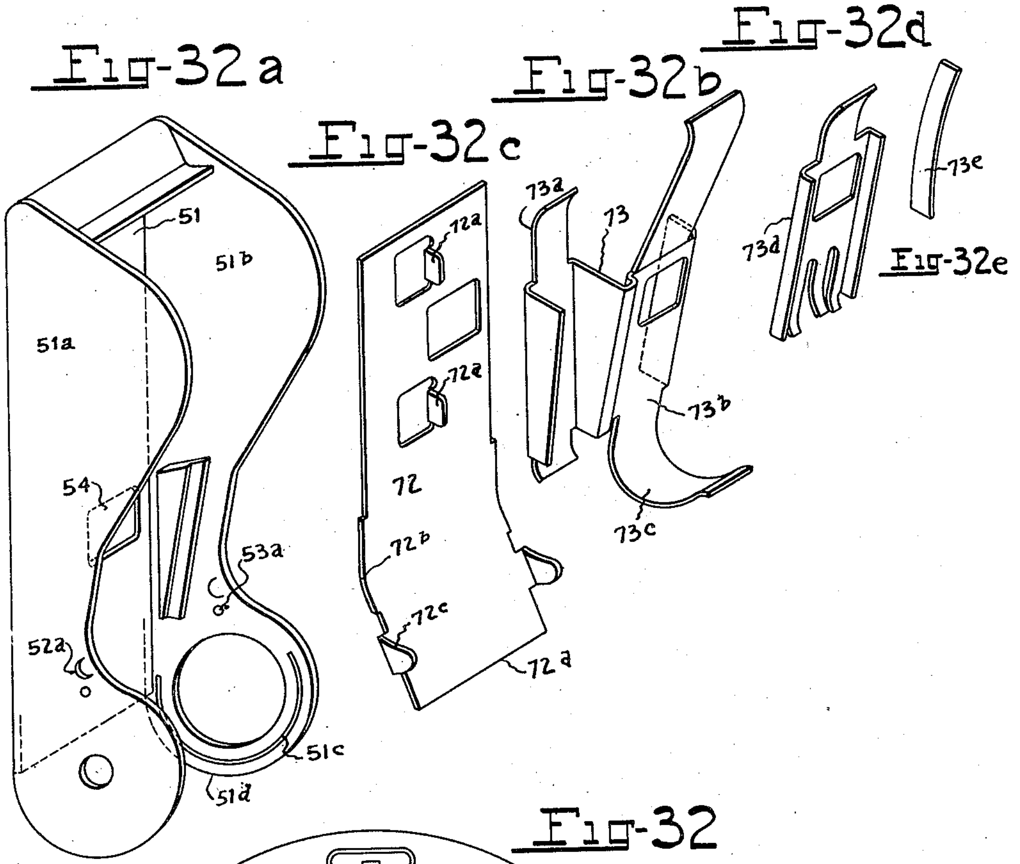
Fig-32a, Fig-32b, Fig-32c, Fig-32d, Fig-32e
Fig-32
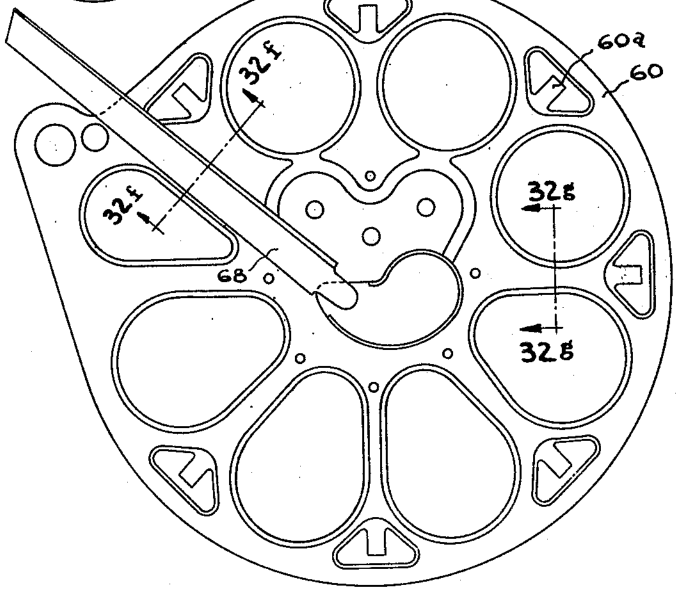
Fig-32f
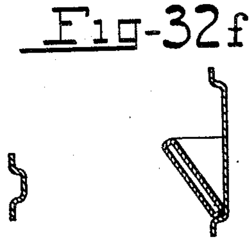
Fig-32g
INVENTOR
JOSEPH S. CHEMEL
BY Fred Gerlach
ATTORNEY

SOUND MOTION-PICTURE PROJECTION APPARATUS

Filed May 27, 1946 14 Sheets-Sheet 13

INVENTOR
JOSEPH S. CHEMEL
BY Fred Gerlach
ATTORNEY

SOUND MOTION-PICTURE PROJECTION APPARATUS

Filed May 27, 1946 14 Sheets-Sheet 14

INVENTOR
JOSEPH S. CHEMEL
BY Fred Gerlach
ATTORNEY

Patented Sept. 5, 1950 2,521,150

UNITED STATES PATENT OFFICE 2,521,150

SOUND MOTION-PICTURE PROJECTION APPARATUS

Joseph S. Chemel, Chicago, Ill.

Application May 27, 1946, Serial No. 672,469

3 Claims. (Cl. 88—16.2)

The invention relates to motion picture projection.

One object of the invention is to provide a projector which includes a projection-unit embodying driving mechanism, a shutter, and lamp house for interchangeable use with a self-contained magazine unit for an endless film which is demountable from the projection-unit and includes film feeding mechanism adapted to be coupled and uncoupled to the driving mechanism of the projection-unit. This makes it possible to furnish self-contained magazines containing endless films which can be furnished and maintained for rental to users. By providing these self-contained magazine units which are adapted to be coupled to the projection-unit, the handling of the film by users for loading and unloading film will be avoided, and can be done by the library system which furnishes films for rental to users. It is only necessary for the user to place the magazine unit in the projector unit for exhibiting the pictures on the film, and the loading and reloading of the magazine is performed by the institution which furnishes the films. This makes it practically impossible for a user to abuse or make improper use of the rented films.

Another object of the invention is to provide a projection-unit which is adapted for demountable endless film magazine units and also for standard two-reel projection, by providing a demountable adapter unit for a film between supply and take-up spools for interchangeable use with the projection unit.

Another object of the invention is to provide a self-contained magazine unit for an endless film which includes feeding mechanism for projecting pictures and is adapted for driving connection with the driving mechanism mounted in the projection-unit.

Another object of the invention is to provide a self-contained magazine unit of this type which is simple in construction and is adapted to be readily placed in and removed from the projection-unit.

Another object of the invention is to provide an adapter unit for demountable use on the projection unit with the standard two-reel projection.

Another object of the invention is to provide an adapter unit of this type which is simple in construction and can easily be attached to or detached from the projection-unit.

Another object of the invention is to provide a projector with sound reproducing equipment which is adapted to utilize a radio set for reproducing sound from a track on the picture-film.

Other objects of the invention will appear from the detailed description.

The invention consists in the several novel features hereinafter set forth and more particularly defined by claims at the conclusion hereof.

In the drawings:

Fig. 7 is a perspective of one of the sections of the holder for the magazine and adapter units.

Fig. 7a is a perspective of the other section of said holder.

Fig. 7b is a section taken on line 7b—7b of Fig. 7a.

Fig. 11 is a section taken on line 11—11 of Fig. 10a.

Fig. 12 is a detail of a cam in the projection unit for driving the intermittent sprocket drum carried by said unit.

Fig. 13 is a section taken on line 13—13 of Fig. 10a.

Fig. 14 is a rear elevation of the parts illustrated in Fig. 13.

Figures 21, 21A, 22, 23, 24:
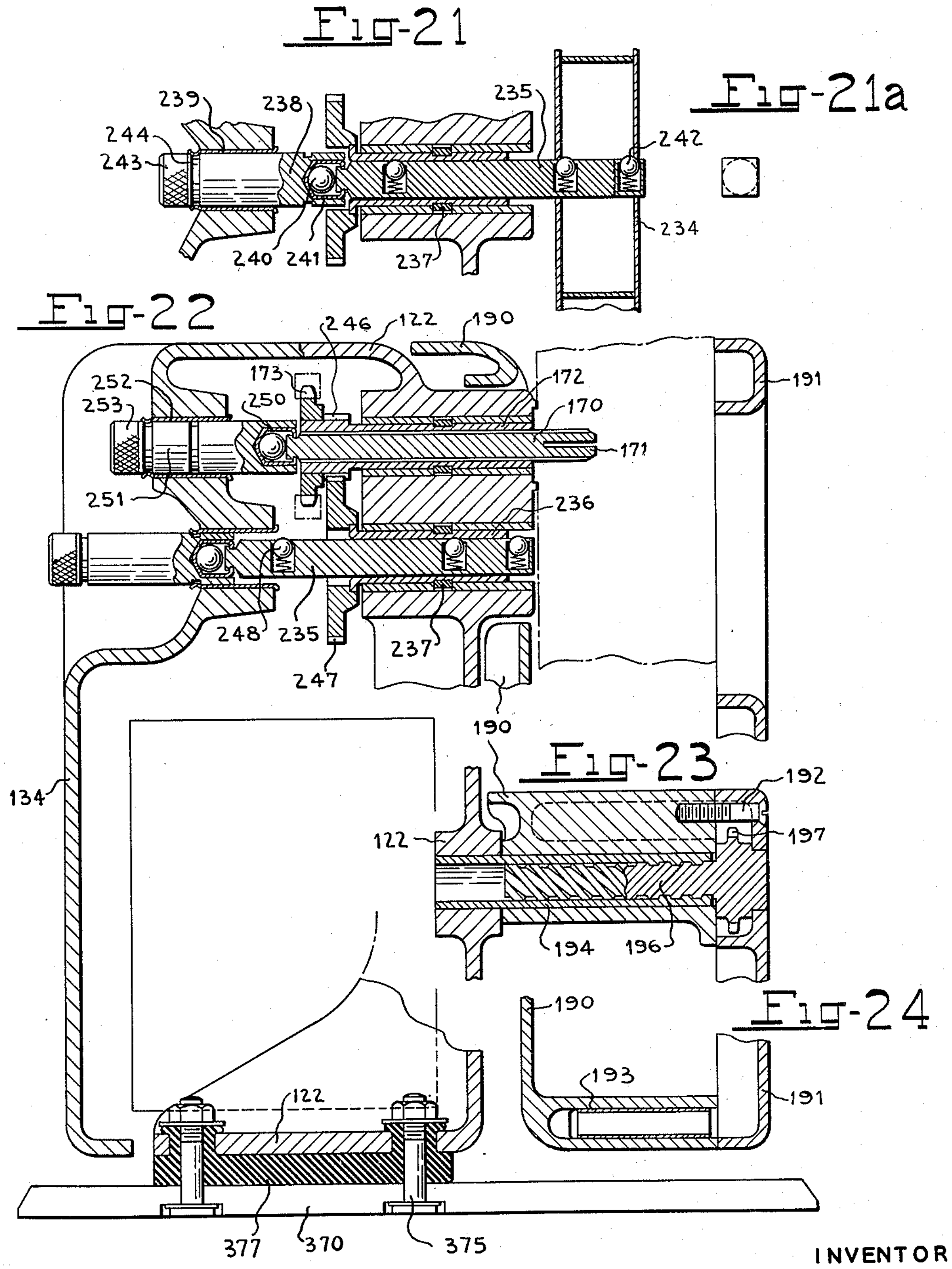
Fig. 21 is a section illustrating the retractable spindle for supporting the take-up spool with the spool in its operative position.

Fig. 21ª is a partial end view of the shaft in Fig. 21.

Fig. 22 is a similar section illustrating the supporting spindle for the take-up spool retracted, and illustrating also the retractable drive spindle for driving the continuous sprocket in the magazine unit.

Fig. 23 is a section through the front lower device for detachably securing the holder for the magazine and adapter units in the projection unit.

Fig. 24 is a section illustrating the resilient member supporting the magazine in the holder.

Figures 25, 26, 27, 28:
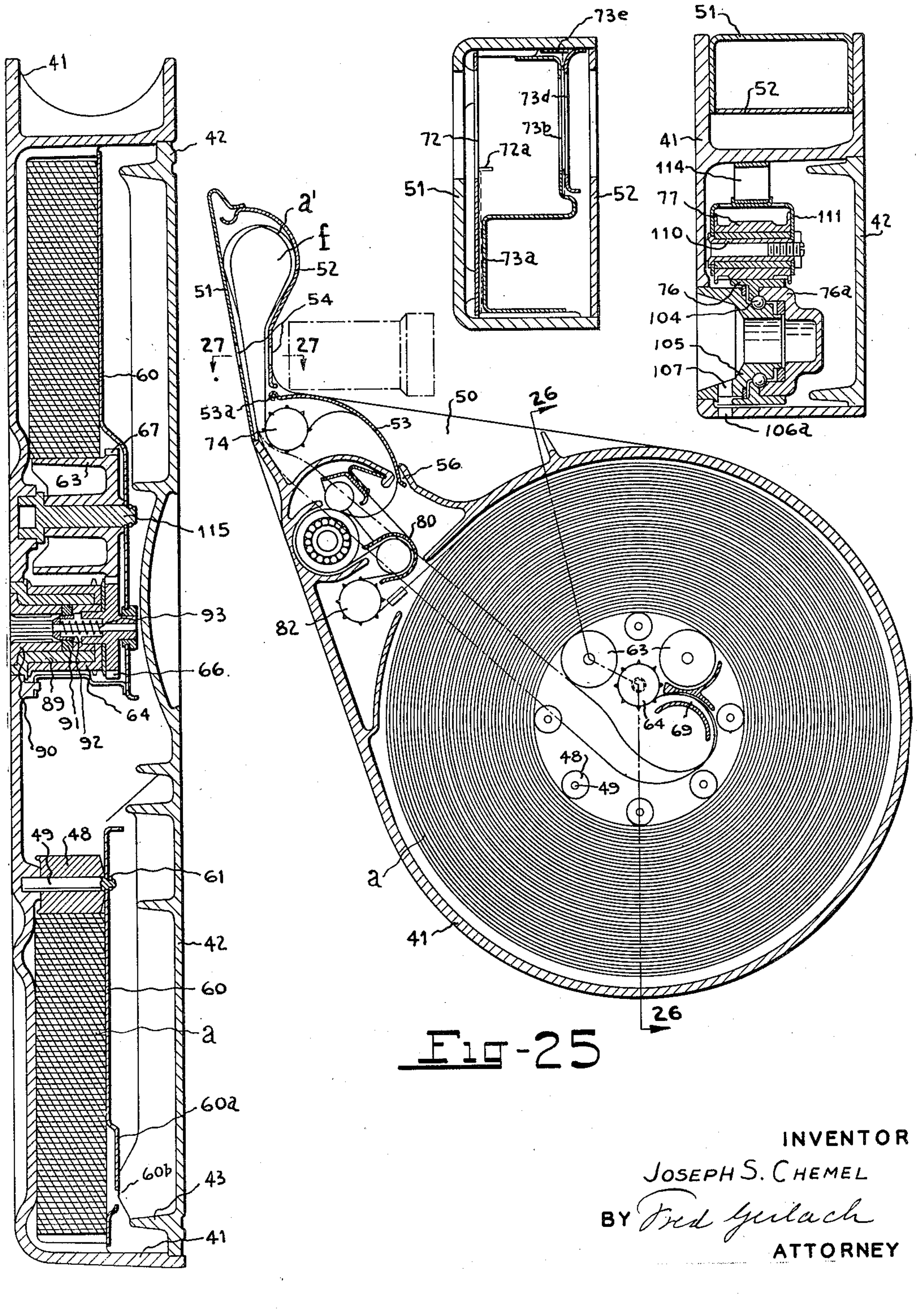

Fig. 25 is a longitudinal section of the endless film magazine.

Fig. 26 is a section taken on line 26—26 of Fig. 25 on an enlarged scale.

Fig. 27 is a section taken on line 27—27 of Fig. 25.

Figures 29, 30, 31, 31A:
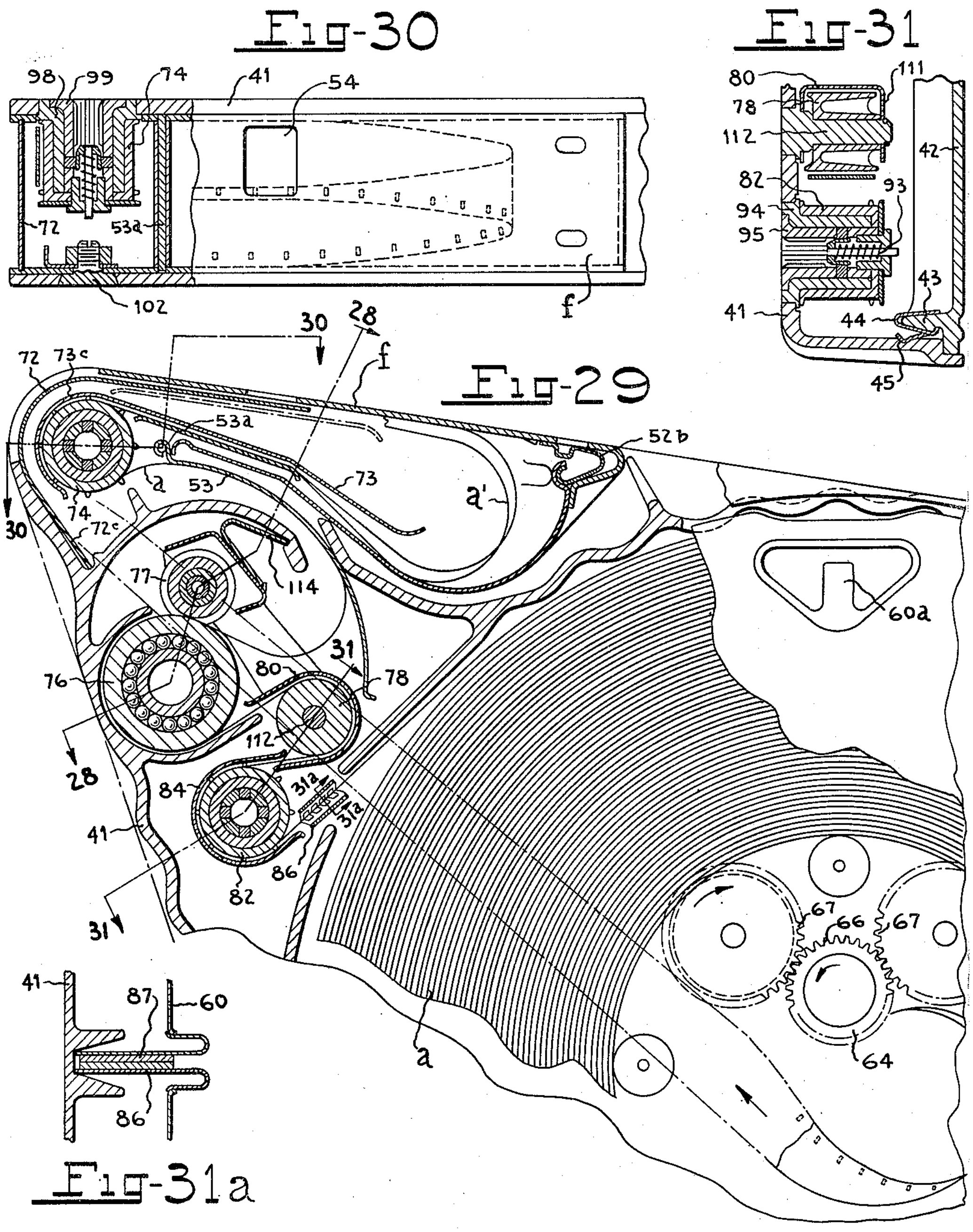

Fig. 28 is a section taken on line 28—28 of Fig. 29.

Fig. 29 is a longitudinal section through a portion of the magazine unit, the projection gate of the unit being folded into its inoperative position.

Fig. 30 is a section taken on line 30—30 of Fig. 29.

Fig. 31 is a section taken on line 31—31 of Fig. 29.

Fig. 31ª is a perspective section through the wiper for the film in the magazine.

Fig. 32 is a side elevation of the plate in the film magazine unit for holding one side of the film, and the channel for guiding the film from the inner convolution of the coil to the projection gate.

Fig. 32ª is a detailed perspective of a section of the film projection gate pivotally carried by the film magazine unit.

Fig. 32ᵇ is a perspective of one of the film guides in said gate.

Fig. 32ᶜ is a perspective of another film guide in said magazine unit.

Fig. 32ᵈ is a perspective of another guide for the loop of film in the projection gate of the magazine unit.

Fig. 32ᵉ is a perspective of the spring strip for guiding the edge of the film in said unit.

Fig. 32ᶠ is a section taken on line 32ᶠ—32ᶠ of Fig. 32.

Fig. 32ᵍ is a section taken on line 32ᵍ—32ᵍ of Fig. 32.

Figures 33, 34, 35, 36, 37, 38, 39, 40, 41:
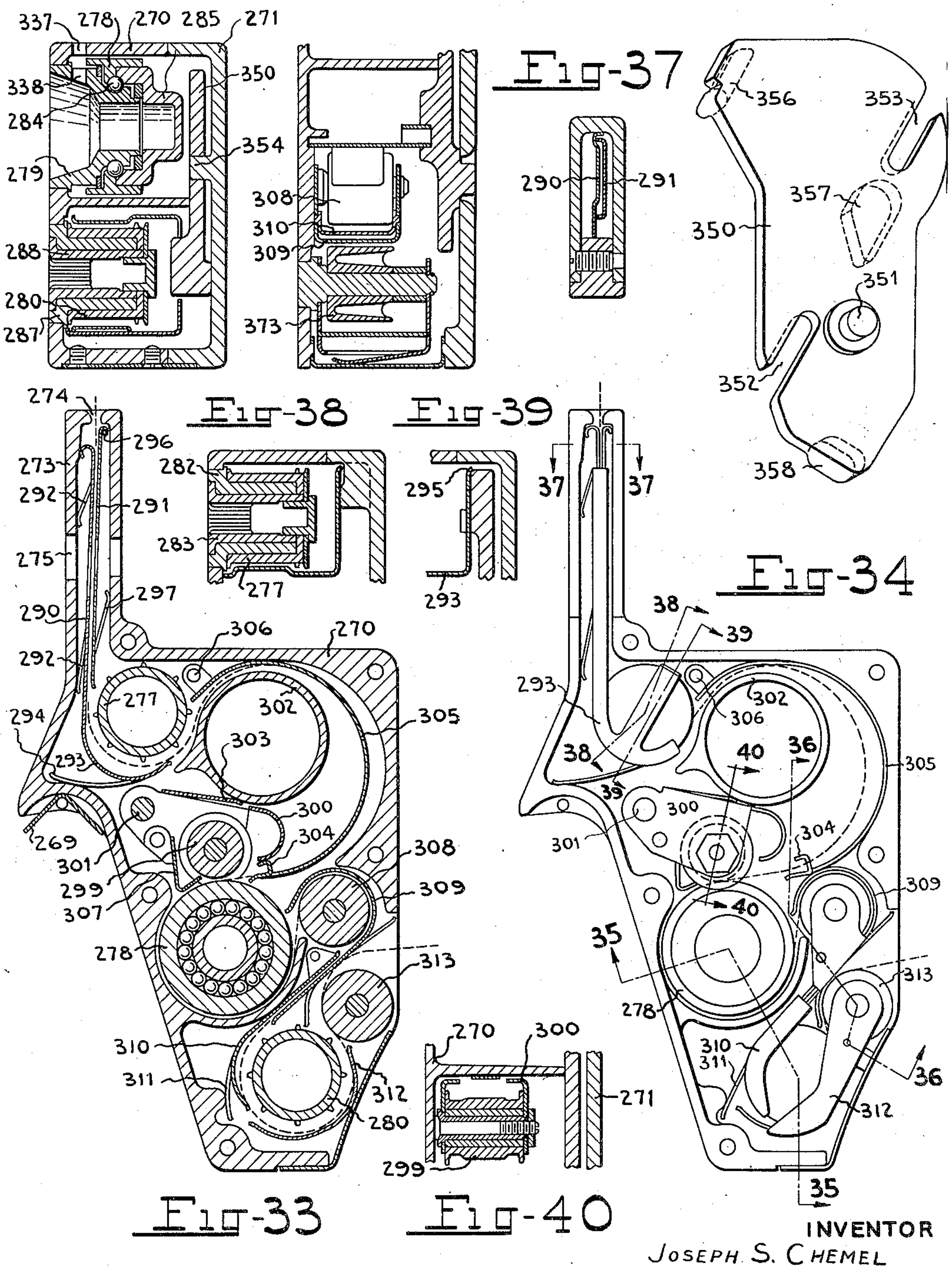

Fig. 33 is a vertical longitudinal section through the adapter unit, the film-guides being shown released for threading the film through the adapter housing.

Fig. 34 is a side elevation of the adapter unit, the cover of the housing being removed for illustrative purposes, the film-guides being shown in film guiding positions.

Fig. 35 is a section taken on line 35—35 of Fig. 34.

Fig. 36 is a section taken on line 36—36 of Fig. 34.

Fig. 37 is a section taken on line 37—37 of Fig. 34.

Fig. 38 is a section taken on line 38—38 of Fig. 34.

Fig. 39 is a section taken on line 39—39 of Fig. 34.

Fig. 40 is a section taken on line 40—40 of Fig. 34.

Fig. 41 is a perspective of the slidable plate in the adapter housing, for releasing the film-guides.

Figure 42:
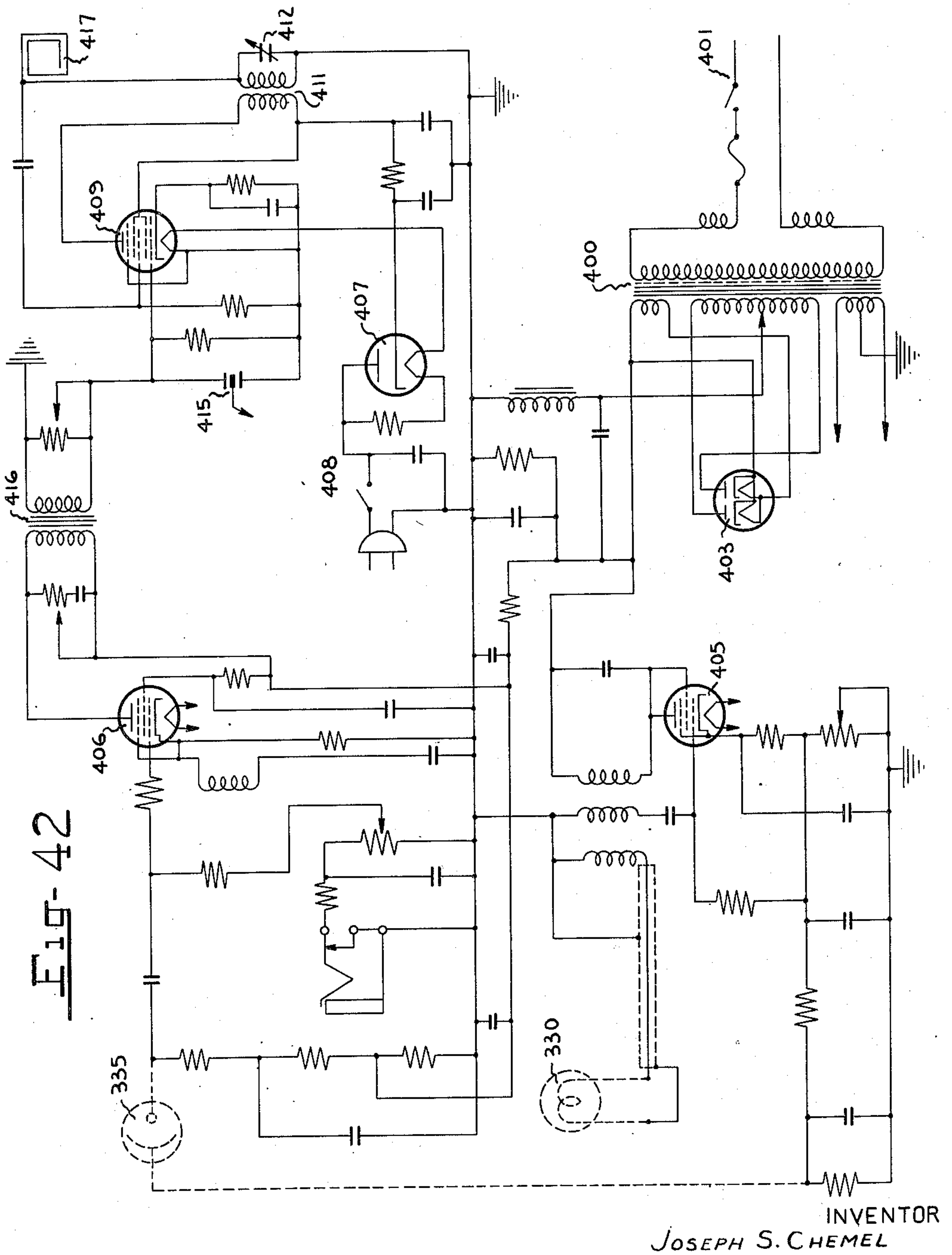

Fig. 42 is a diagram of the electronic equipment for reproducing sound from the sound track on the film and transmitting the sound to the amplifier of a radio set.

The invention comprises generally a projection unit which includes a suitable supporting structure or frame; a projection lamp; a shutter; motor-driven driving mechanism for film feeding devices and the shutter; a self-contained magazine unit which is demountable from the projection unit, for an endless film which includes film feeding devices in the magazine unit, detachable from and adapted to be driven by the driving mechanism in the projection unit, and guides for the film; and an adapter unit which is demountable from the projection unit, for projecting a film between a supply reel to a take-up reel.

The demountable magazine unit (Figs. 25–32) comprises a case or container 40 for an endless film. This case includes a hollow body 41, with an open side and an integral rim, and a cover 42. Cover 42 is provided with an integral inwardly projecting rib 43 (Fig. 31) and is detachably secured to the body 41 by a series of resilient clips 44 (Fig. 31) which are secured to rib 43 and are provided with resilient tongues 45 which snap into recesses in the rim of the case. The magazine sections are preferably formed of molded phenolic plastic material. These clips are adapted to secure the cover 42 and body-section 41 together so that it will be difficult for the lessee of the magazine to remove the cover. After the cover is snapped in place, it can be removed by applying vacuum thereto by the lessor. The housing 40 is generally cylindrical and formed with an angular extension for supporting the projection gate and forming a pocket into which the gate is foldable.

The inner convolution of a coil of motion picture film *a* is rotatably and centrally supported in the magazine case by an annular series of rollers 48 (Figs. 25 and 26) which are journalled on studs 49 supported in the body-section 41 of the magazine case.

A plate 60 of sheet metal fits inside of the rim of body-section 41 of the case 40 and positions the coil of film *a* transversely in said case. Tongues 60ª on plate 60 engage lugs 60ᵇ on cover-section 42 (Fig. 26) so that plate 60 will hold the coil of film close to the inner face of body-section 41. Plate 60 is removably held in said case by split rings 61 at the inner ends of studs 49 on which rollers 48 are journalled. Plate 60 also supports the guide hereinafter described for directing the film from the center of the coil *a* to the projection gate *f* for the film.

The projection-gate, generally designated *f*, through which loop *a'* of the film *a* is fed for projection of the pictures thereon, is pivotally supported between integral side-portions of section 41 of the case so it can be pivotally shifted from its operative position behind the projection lens hereinafter described, into a recess or a pocket 50 in said section, when the magazine unit is detached from the projection unit. Gate *f* comprises a straight rear wall 51 (Figs. 25 and 32a), a front wall 52 and side-walls 51a and 51b, all of which are formed of sheet metal. Aligned openings 54, through which light passes for projection of pictures on the film, are formed in walls 51, 52. An arcuate member 53, pivoted at 53a to the side wall 51b of the gate, forms a slidable closure between the lower end of the front wall 52 of the gate and a slot 56 in the magazine case while the gate is extended into position for projection of the pictures. Front wall 52 is bulged outwardly to provide sufficient space for the loose loop *a'* of film *a* from which the film is fed to the intermittent feed drum hereinafter described. The front wall 52 of the projection gate is removably secured between the side walls 51a and 51b by snap plugs 52a instruck from said walls, and a spring clip 52b secured in the distal end of the projection gate to permit the front wall to be shifted for access to the film and parts in the gate.

The endless film *a* is fed and guided from its inner convolution to and from a loop *a'* in the gate and from said loop to the outer convolution of the coil by: a pair of driven drums or rolls 63 (Figs. 25, 26 and 27), the outer peripheries of which frictionally engage the inner convolution of the coil of film; a drum 64 provided with sprocket teeth to which the film passes from one of the rolls 63, and which is journalled on studs 115 in the case 40 and is adapted to be detachably connected to and driven by mechanism on the projector unit as hereinafter described; a gear 66 which is fixed to the driven sprocket drum 64 and meshes with and drives gears 67 on the feed rolls 63; an arcuate guide 69 which is formed by integral portions of the body-section 41 of the magazine case and to which the film passes from drum 64; a guide 68 secured on plate 60 into which a loop of the film from arcuate member 69 passes and by which the film is directed with a quarter-turn into a plate past the coil of film *a*, and thence into one side of the projection gate along its rear wall 51. The loop *a'* is deflected from one side of the projection gate to the other to cause the downwardly moving extending portion of the loop to travel in a plane across projection opening 54 at one side of the gate while the upwardly traveling portion of the loop is laterally offset relatively to said opening and adjacent the opposite side of the gate. From the loop *a'*, the film passes onto an intermittent feed spocket 74. The projection gate is pivoted to swing on a point co-axial with the intermittent feed sprocket 74, and for this purpose one of its side walls 51b has a bearing on a sleeve 98, on which sprocket 74 is journalled and the other side wall 51a is pivoted on a stud 102 which is carried by the cover 42 and is co-axial with said sleeve. The loop of the film is directed from one side of the gate to the other by a guide, generally designated 73, illustrated in Fig. 32b, which includes a guide-member 73b, for guiding the downwardly moving portion of said loop which is provided with a lower arcuate terminal 73c which guides the film on and partially around the sprocket drum 74. A pressure plate 73d (Fig. 32d) which is provided with resilient ends, guides the film against the front face of the members 73b of guide 73. The film is guided upwardly between 72 and 73a and between 51a and 72a. A resilient strip 73e guides the edge of the film passing between the guide member 73a and pressure plate 73d. From sprocket drum 74, the film is looped and passes between a sound drum 76 and a spring-pressed guide roll 77. After passing partially around the sound drum, the film is directed by a guide 80 to an idler roll 78. From roll 78, the film passes to and partially around a continuous feed sprocket drum 82 around which the film is directed by a guide 84. The drum 82 feeds the film to the outer convolution of the coil in the case of the magazine. Guide 72 serves as a closure for opening 54 when projection gate *f* is folded into pocket 50, and also serves as a corner wall when gate is folded into pocket. Guide 72 is held in place with 72b engaged in groove 51c. Lugs 72c bear against edge 51d and edge 72d bears against wall in body section 41.

Between sprocket-drum 82 and the coil of film *a* in the case, the film is wiped for removing foreign particles from the film before it is rewound onto the coil. The means for wiping the film comprises (Figs. 29 and 31a) a pair of resilient strips 86 mounted on the plate 60 and diagonally extending wiping edges 87, on said strips, and between which the film passes.

The out-feed sprocket drum 64, the intermittent sprocket drum 74, and the in-feed sprocket drum 82 are adapted to be coupled to and uncoupled from power operated shafts on the projection-unit hereinafter described, for operatively connecting them to the driving mechanism on the projection unit and demounting the film magazine from the projection unit, by lateral movement of the magazine unit relatively to the projection unit. The out-feed sprocket drum 64 (Fig. 26) is journalled on a bearing sleeve 89 which is fixed in the side of the body-section 41 of the magazine case and is secured to a coupling sleeve 90 which extends through bearing sleeve 89, and has a splined bore for coupling it to a drive spindle on the projection unit. A series of brake shoes 91 are guided radially in the coupling sleeve 90 and are normally forced outwardly by a conical plunger 92 to frictionally engage the inner periphery of bearing sleeve 89 and secure the sprocket drum 64 against rotation while it is uncoupled from its driving spindle on the projection unit. Brake shoes 91 are adapted to be released from gripping the bearing sleeve 89, by a spring-pressed plunger 92 which has its stem slidably guided in the hub of gear 66 and is engageable by said spindle on the projection unit, and releasing said brake-shoes when said spindle enters sleeve 90 while coupling the magazine to the projection unit.

The in-feed sprocket drum 82 (Fig. 31) is journalled on a bearing sleeve 94 which is fixed in body-section 41 of the magazine case and is fixedly secured to a coupling sleeve 95 which extends through the bearing sleeve 94 and is provided with a splined bore for detachably coupling it to a drive shaft on the projector unit hereinafter described. Coupling sleeve 95 is also provided with a brake device similar in construction to that described in coupling sleeve 90 and bearing sleeve 89 for the out-feed sprocket drum 64, for braking the sprocket drum 82 against rotation when the magazine unit is uncoupled from the projection unit and automatically releasing the sprocket drum 64 when said units are coupled together.

The intermittent feed sprocket 74 (Fig. 30) is journalled on a sleeve 98 which is fixed in one side of the body-section 41 of the magazine case and is fixedly secured to a coupling sleeve 99 which extends through bearing sleeve 98. Coupling sleeve 99 has a splined bore for detachably coupling and driving it from a drive shaft on the projection unit. Coupling sleeve 99 is also provided with a braking device similar in construction to that described in coupling sleeve 90 for the out-feed sprocket drum 64 for automatically braking sprocket 74 against rotation when the magazine unit is uncoupled from the projection unit and releasing the brake when the sleeve 99 is coupled to said shaft.

The sound drum 76 (Fig. 28) is journalled on a ball bearing 104 which is carried by a bearing sleeve 105 which is fixed in the body-section 41 of the magazine case. Drum 76 is fixed to a race 76[a] which is adapted to be frictionally engaged by shaft 205 of a fly wheel 207 in the projection unit hereinafter described. An orifice 106 is formed in the rim of the magazine case and an axially aligned opening 107 is formed in sleeve 105 for the passage of a beam of light through the sound track on the film. Guide roll 77 (Figs. 28, 29) is journalled on a tubular stud 110 which is mounted in a frame 111 which has side-members pivotally supported on the pin 112 which carries the idler roll 78. Frame 111 is engaged by a resilient or spring strip 114 which is confined in body-section 41 of the magazine case, for pressing roll 77 against the film on the sound drum 76. Guide 80 around idler roll 78 may be integrally formed with frame 111.

The magazine unit thus described constitutes a self-contained structure with an endless film therein and includes a case for a roll of film, a foldable projection gate through which a loop of the film *a* is fed, and continuous and intermittent sprocket-drums for feeding the film through the projection gate for optical reproduction and for sound reproduction and in which the film remains threaded. This unit also includes detachable couplings for driving the intermittent and continuous feed drums from the projection unit hereinafter described. The film is retained threaded in the case so that the units are adapted to be supplied by film agencies, ready for use on the projection unit. The self-contained character of the magazine unit avoids the necessity of handling the film by the user and makes it possible for the film suppliers to do all the necessary handling and threading of the film with care. The magazine unit is adapted for an endless film and to wind it into a roll so that it is not necessary to rewind the film, as must be done in conventional two-reel projection. The roll of film is directly supported by the idler rolls 48 which are carried by the case and rolls 63 are adapted to frictionally rotate the roll so that wear in the film perforations by the sprocket drum 64 will be obviated.

The projection unit comprises generally a supporting frame or structure; power driven mechanism for driving, through detachable couplings, the film feeding devices carried by the magazine unit; the projection lens, lamp-house and the associated devices for projecting pictures on the loop of film passing through the gate *f* of the magazine unit and reproducing sound from the sound track on the film. A hub 334 on the projection unit is adapted to precisely align the magazine unit with the coacting devices on the projection unit.

The supporting frame or structure of the projection unit comprises a transversely extending back-member 120 and an upstanding housing 122 at one side of and extending forwardly from member 120, which includes a removable cover-section 134, and a back-section 131 which is hinged at 132 to member 120. An electric lamp 135 for light projection is pivotally supported in the back-section 131, at pivot 140. A cover 138 is hinged at 139 to the back-section 131 for access to the lamp 135 and a reflector 137 is mounted in said cover. Condenser lenses 136 are supported in a transverse wall of the back-section 131. A suitable projection lens *e* is mounted in a tubular member 129 which is integral with and projects laterally from the housing 122.

An electric motor 125, including a shaft 142, is mounted in a shell 128 which is disposed in the lower portion of the housing 122.

Figures 11, 12, 13, 14:
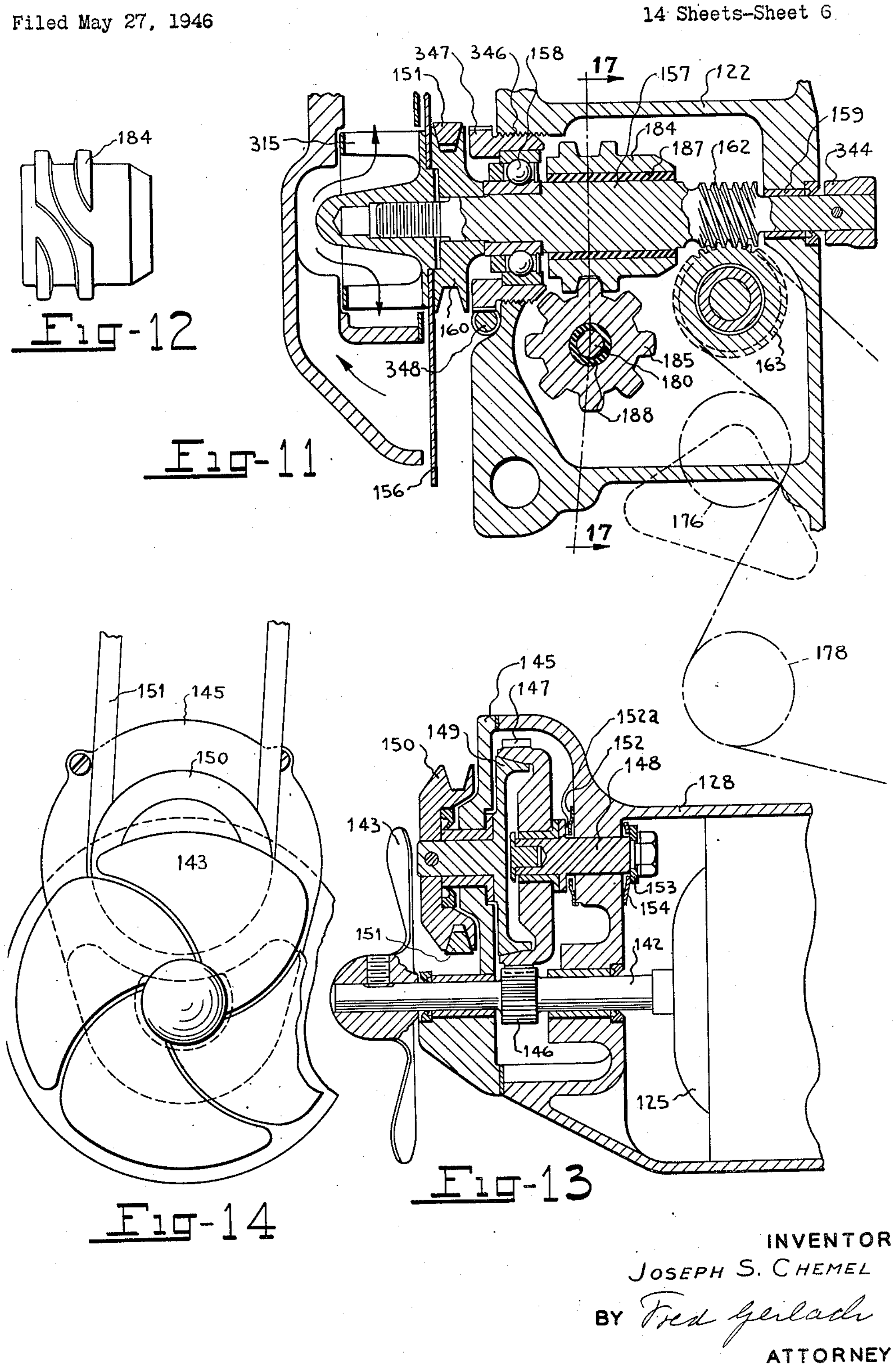

The driving mechanism of the projection unit includes (Fig. 13) a pinion 146 on the motor-shaft 142; a gear-wheel 147 which meshes with pinion 146, is provided with a conical internal clutch-face and is journalled on a stud 148 which is mounted for axial movement in a cross-wall in shell 128; a clutch-member 149 is engageable with the friction face on gear-wheel 147 and has a stud-shaft journalled in a removable head 145; and a pulley 150 for a V-belt 151 which is secured to rotate with clutch-member 149. Shaft 142 of electric motor 125 is extended rearwardly from the motor and has secured thereto a rotary air impeller 143 for forcing air through a duct 144 in back-section 131 into the chamber around lamp 135 (Fig. 6) for cooling purposes. Stud-shaft 148 is axially slidable in shell 128 and is urged inwardly for the engagement of the friction face of gear wheel 147 and clutch-member 149 by a resilient member 152 which is fixed on the head in shell 128. Cam lobe 152[a] on member 152, holds stud 148 in clutched position. When stud 148 is rotated to bring notch in flange of 148 in alignment with lobe 152[a], spring 154 disengages clutch. A lever 153 is fixedly secured to one end of stud-shaft 148 and extends outwardly through a slot in one side of the frame-member 120 for rotating stud-shaft 148, to couple and uncouple the members of said clutch. A spring disk washer 154 normally urges shaft 148 in one direction to uncouple the clutch-members 149 when shaft 148 is rotated to uncouple said clutch-members. The shutter and mechanism for driving the film feed devices mounted on the projection unit are driven from pulley 150, as hereinafter described. When clutch-member 149 is disengaged from friction face of gear-wheel 147, pulley 150 and the mechanism driven thereby will be idle for still projection of pictures on the film. At such time the air impeller 143, which is directly connected to the motor-shaft 142 will continue to be operated for cooling lamp 135.

Figure 10:
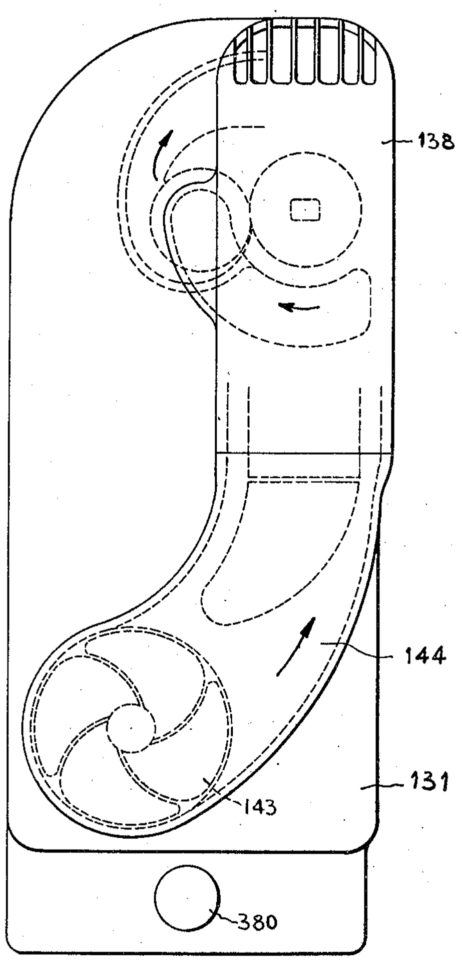
Fig. 10 is a rear view of the projector unit.
Figure 10A:
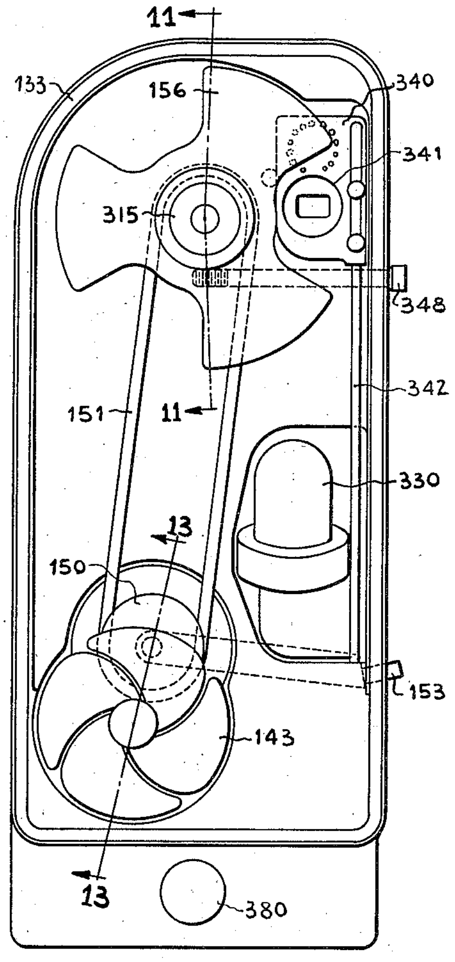
Fig. 10a is a rear elevation of the projector unit, the lamp house and frame section, which carries said house, being removed.

A rotary three-bladed shutter 156 (Figs. 10[a] and 11), for intermittently interrupting the projection of light through the film, is secured to a shaft 157 which is journalled in an anti-friction bearing 158 and in a bushing 159 in the upper portion of housing 122. Shaft 157 and shutter 156 are driven by V-belt 151 which is driven by pulley 150 and extends around a pulley 160 which is fixedly secured to shaft 157. Shaft 157 drives the mechanism carried by the projection unit for driving the intermittent and continuous film feed devices.

Figures 15, 16, 17:
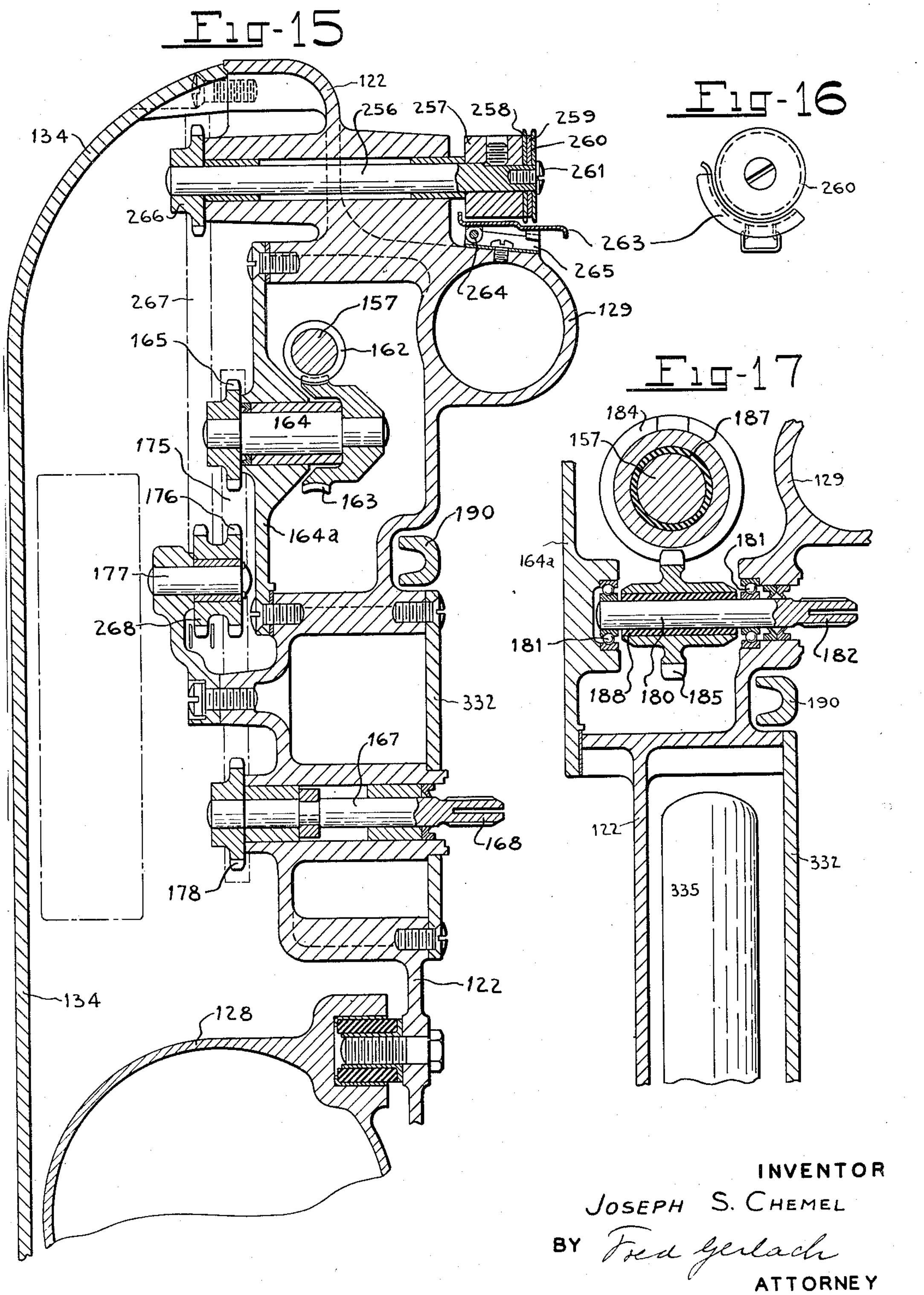
Fig. 15 is a section through the projection unit taken on line 15—15 of Fig. 6.
Fig. 16 is a detail view of the drum for drawing the film from a film-spool and the guide-shoe for the film associated with said drum.
Fig. 17 is a section taken on line 17—17 of Fig. 11.

The mechanism on the projection unit for driving the continuous film feed devices are driven by a worm 162 which is integral with shutter-shaft 157 and meshes with and drives a worm-gear 163 (Figs. 11 and 15), which is fixed to shaft 164. Shaft 164 is mounted in a head 164[a] which is secured by screws to the housing 122. A transversely extending shaft or spindle 167 (Fig. 15) is journalled in housing 122 and provided with a splined terminal 168 which projects from said housing and is adapted to fit into the sleeve 95 which is secured to, and to drive, the continuous feed sprocket-drum 82 in the magazine unit. A shaft or spindle 170 (Fig. 22) is journalled in housing 122 and is provided with a splined terminal 171 which projects from housing 122 and is adapted to enter the splined sleeve 90 for driving the continuous sprocket-drum 64 in the magazine unit. A sprocket wheel 173 is fixed to shaft 170. A sprocket chain 175 extends around and is driven by sprocket wheel 165 on shaft 164 and extends around sprocket wheel 178 on shaft 167, and a sprocket 176 which is journalled on a stud 177, and around sprocket wheel 173 on shaft 170 for synchronously and continuously driving the sprocket-drums 82 and 64 in the magazine unit, when the latter is mounted in operative relation to and coupled to the driving mechanism on the projection unit.

A spindle 180 (Figs. 11 and 17) is journalled in bearings 181 in the housing 122 and is provided with a splined terminal 182 which is adapted to enter and engage sleeve 99 for driving the intermittent sprocket-drum 74. Spindle 180 is intermittently driven by a rotary cam 184 which meshes with a gear 185 on spindle 180. Cam 184 is secured to shaft 157 by an elastic sleeve 187, and gear 185 is secured on spindle 180 by an elastic sleeve 188. These elastic sleeves are made of rubber, which prevents the transmission of noise produced by metallic contact of cam 184 and gear 185, from traveling beyond the sleeves.

Figures 18, 19, 20:
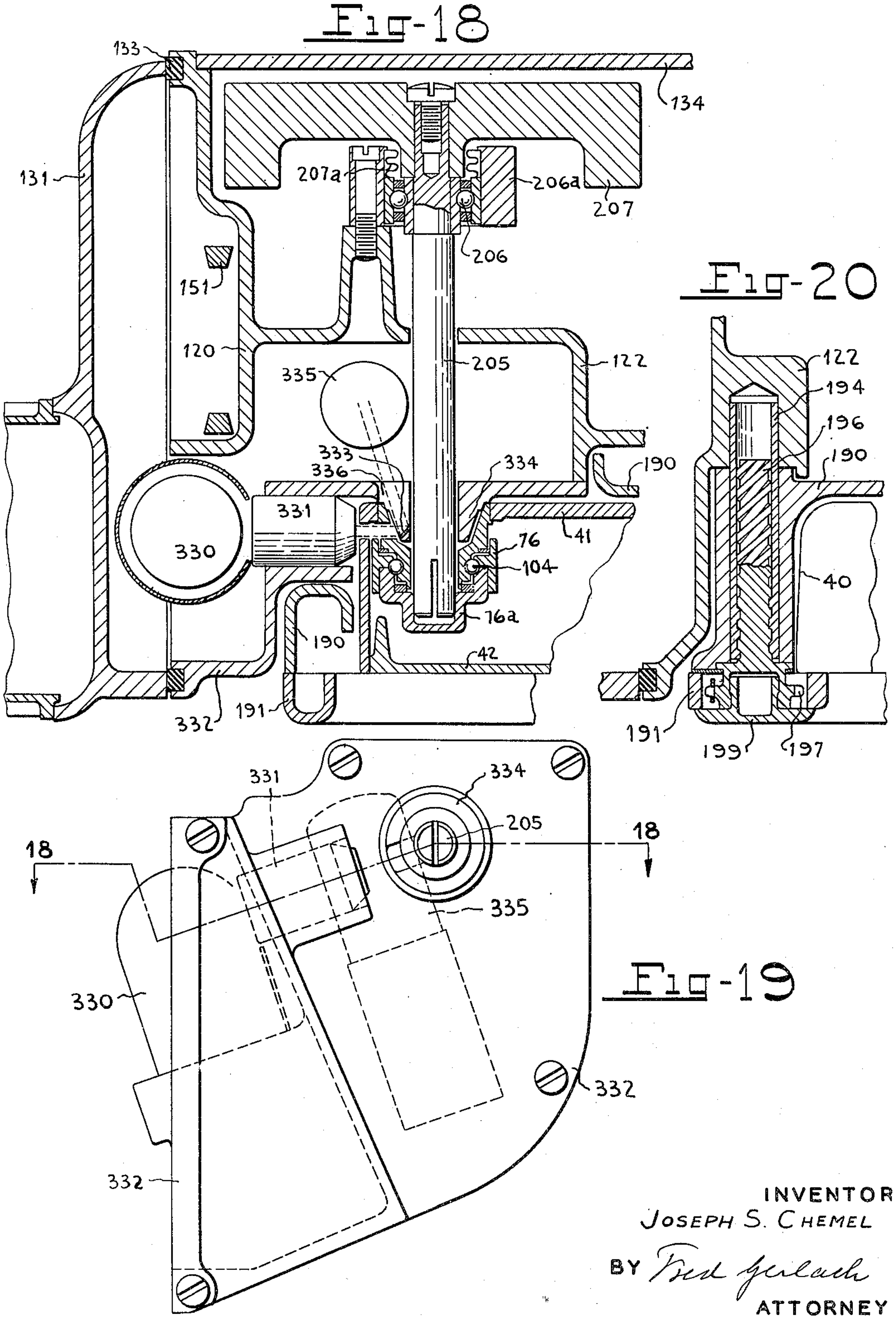
Fig. 18 is a section taken on line 18—18 of Fig. 19.
Fig. 19 is a side elevation of the portion of the projection unit in which are mounted the exciter lamp and the photo-electric cell used for sound reproduction, the photo-electric cell and condenser lens being shown in dotted lines.
Fig. 20 is a transverse section illustrating one of the screw devices for removably securing the holder for the demountable units in the frame of the projection unit.

A shaft 205 (Fig. 18) is mounted in an anti-friction bearing 206 which is axially slidable in a head $206^a$ which is fixed to the housing 122. Shaft 205 carries a fly wheel 207 and its inner end projects from said housing and is adapted to enter and engage the race $76^a$ which is fixed to rotate with sound drum 76. A resilient sleeve $207^a$ between head $206^a$ and bearing 206 permits axial movement of and presses shaft 205 for frictional engagement of the shaft with said race $76^a$, when the magazine unit is mounted on the projection unit.

This exemplifies driving mechanism with spindles which can be detachably coupled to the take-off sprocket-drum 64, the feed-on sprocket-drum 82 and spindle 180 for intermittently driving the sprocket-drum 74 of the magazine unit, which are mounted on and driven by mechanism forming part of the projection unit, for readily mounting and demounting magazine units containing different films.

A still picture shutter 340 (Fig. $10^a$) is provided with an opening 341 which is normally co-axial with the projection lens *e*, is slidably mounted on a wall of frame member 120 and is connected by a rod 342 to the lever 153 which controls the clutch-member 147 for coupling the belt pulley 150 so it will be driven from motor-shaft 142. When lever 153 is depressed, shutter 340 will be lowered to restrict the flow of light through projection lens *e* and simultaneously the clutch for driving the rotating shutter 156 will be uncoupled to render the rotary shutter and mechanism for driving the feed sprockets inoperative. When clutch-members 147 and 149 are uncoupled, the film feeding mechanism will be stopped for still picture projection, while the impeller 143 is driven to force air through the lamphouse.

When the magazine unit is coupled to the projection unit, a lamp 330 (Fig. 18) projects a light beam through condenser lens 331, orifice 106 in the magazine case, and opening 107 in sleeve 105 to the sound track of the film, and strikes a mirror 333 in housing 332. The mirror reflects the light through aperture 336 in housing 332 to a photo-electric cell 335 which is mounted in a chamber in housing 122.

A switch 360 for controlling the circuit for the motor 125 for operating the projector, and a switch 361 for controlling lamp 135, are mounted in one side of the projector frame.

A blower 315 (Fig. 11) is secured on shaft 157 to rotate with shutter 156. At one side of the condenser lens 136, the housing 131 is provided with a torus shaped cavity through which air is drawn by the blower 315, which rotates with the shutter-shaft 157, from the projection light-opening at the front of the condenser lens, and forced into the torus shaped passageway and across the top of the projector lamp 135. In this manner, blower 315 cools the parts surrounding the light beam, causes a cooling draft of air about the projection gate *f* of the magazine, and reduces the amount of heat transmitted to the film and the film magazine.

A handle or button 344 is secured to one end of shaft 157 and is adapted to rotate said shaft for manually rotating the film feeding mechanism to frame the pictures on the film in alignment with the projection opening and for manually operating said mechanism for still picture projection.

Bearing 158 for shutter-shaft 157 is screw-threaded to the housing 120 (Fig. 11) at 346 and provided with peripheral teeth 347. A screw 348 (Fig. $10^a$) mounted in the housing-member 120, meshes with teeth 347 for rotating bearing 158 to axially adjust sleeve 158 and cam 184, for aligning the picture on the film with opening 54 of the projection gate *f*.

Figures 7, 7A, 7B:
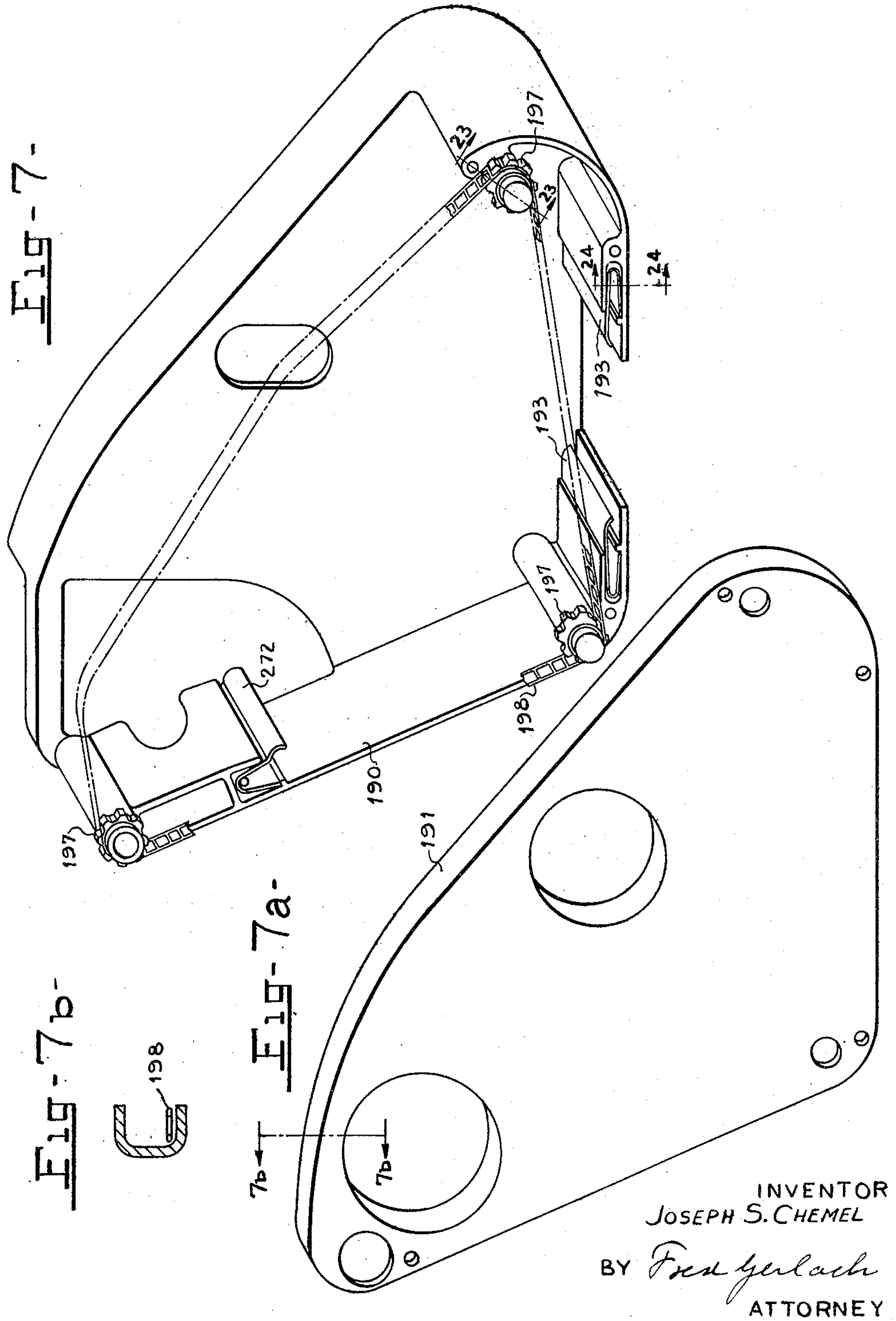

Figs. 7 and $7^a$ illustrate a holder which is adapted to support the magazine unit in operative connection with the projection unit. This holder comprises sections 190 and 191 between which the magazine unit fits, with the upper portion of the unit and its projection gate above the holder.

Holder section 190 is slidable transversely on hollow studs 194 which have one of their ends fixedly secured in the housing 122. Section 191 is removably secured to section 190 by screws 192 (Fig. 23). The holder is slidably connected to housing 122 by screw-shafts 196 which have threaded engagement with the hollow studs 194 and are each provided, in section 191, with an integral sprocket 197. An endless sprocket chain 198 in section 191 extends around sprockets 197 for their conjoint rotation. One of the sprockets 197 (Fig. 20) has frictionally connected thereto a knob 199 for rotating said sprocket to operate chain 198 for conjointly rotating screw-shafts 196 for shifting the holder transversely toward and from the projector housing 122. The lower portion of the case of the magazine unit is adapted to rest on resilient strips 193. The magazine unit is supported in the holder on resilient strips 193 for self-alignment of and preventing off-center loading of the detachable couplings of the driving connections between the projector unit and the magazine unit.

In mounting the magazine unit in the projector unit, the holder-section 191 is shifted away from housing 122 by the operation of screws 196 and the magazine unit is placed between the sections of the holder. The chain 198 is then operated by knob 199 to shift the holder-section 191 and the magazine unit, toward the housing 122, to operatively connect the detachable couplings between the film feeding devices on the magazine unit and the driving mechanism on the projector unit. When the magazine unit is to be removed, the knob 199 is operated to rotate the screw shafts 196 to shift the holder and the magazine unit away from housing 122 to uncouple the driving connections between the projector unit and the magazine unit.

This exemplifies a holder for the magazine unit which is adapted for mounting the magazine unit in operative connection with the projector unit by rectilinear transverse movement of the holder and the magazine unit.

Figures 8, 9:
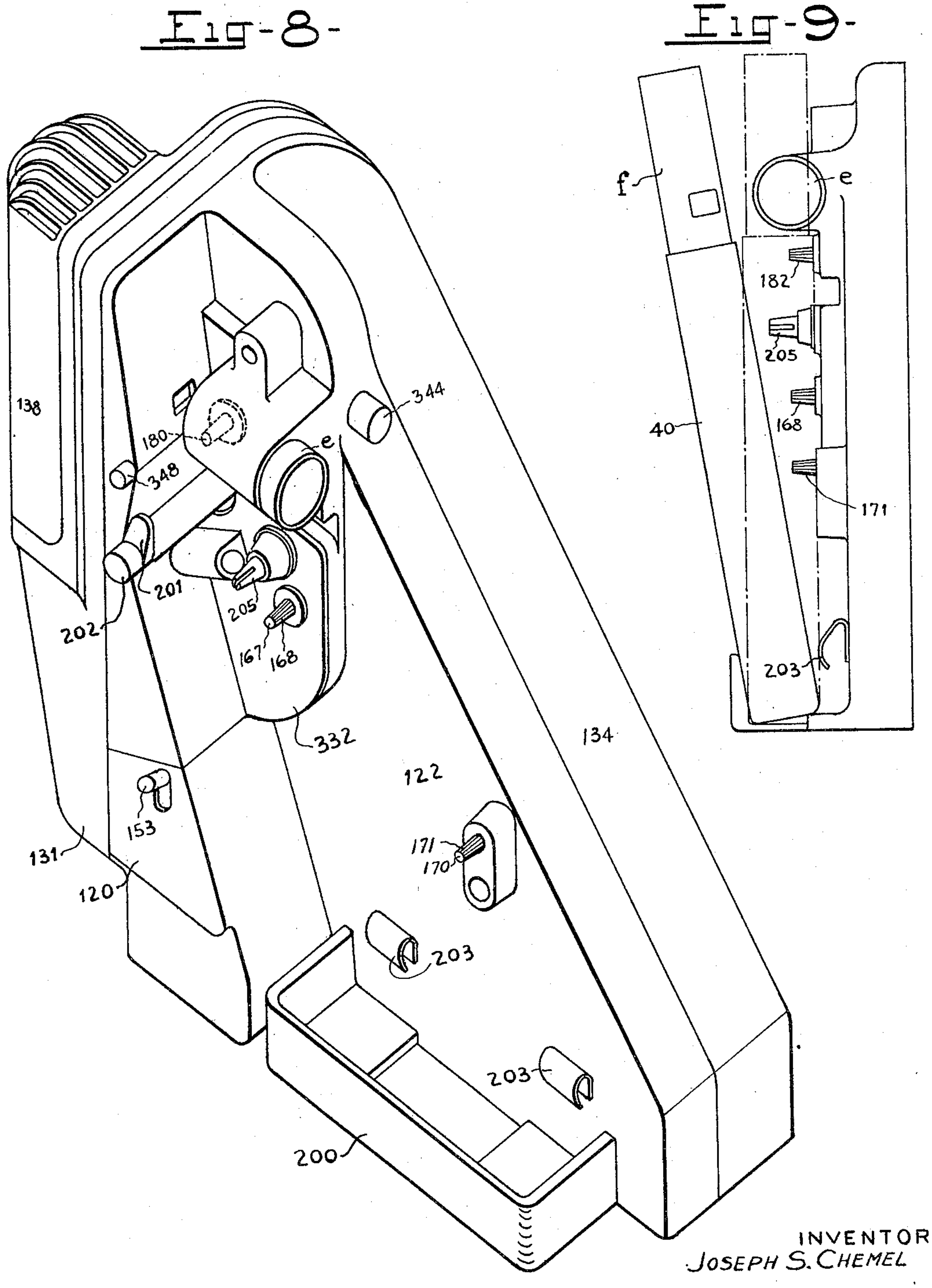
Fig. 8 is a perspective of a modified projector unit in which a stationary magazine holder is employed.
Fig. 9 is a diagrammatic view of one side of the frame of the modified projector unit shown in Fig. 8, illustrating, by dotted lines, the magazine unit in its operative position and by full lines in tilted position for removal of the magazine unit.

A modified construction for securing the magazine unit in operative connection with the projection unit is illustrated in Figs. 8 and 9. In this modification, the lower portion of the magazine unit is inserted in a rectangular socket 200 formed in an extension of housing 122 and the upper part of said unit is removably secured by an arm 201 on a button 202 which is pivotally mounted in the housing 122 and is adapted to engage the upper portion of the magazine unit and detachably secure said unit in operative connection with the projector unit. In this modification, the driving splined spindles are conically shaped to permit tilting the magazine and attaching thereto. In this modification, resilient strip 203 engages the inner side of the magazine case, and the magazine unit is tiltable laterally when lug 201 is rotated out of its path to couple the film feeding devices on the magazine unit and the driving spindles on the projector unit.

Figures 6, 6A:
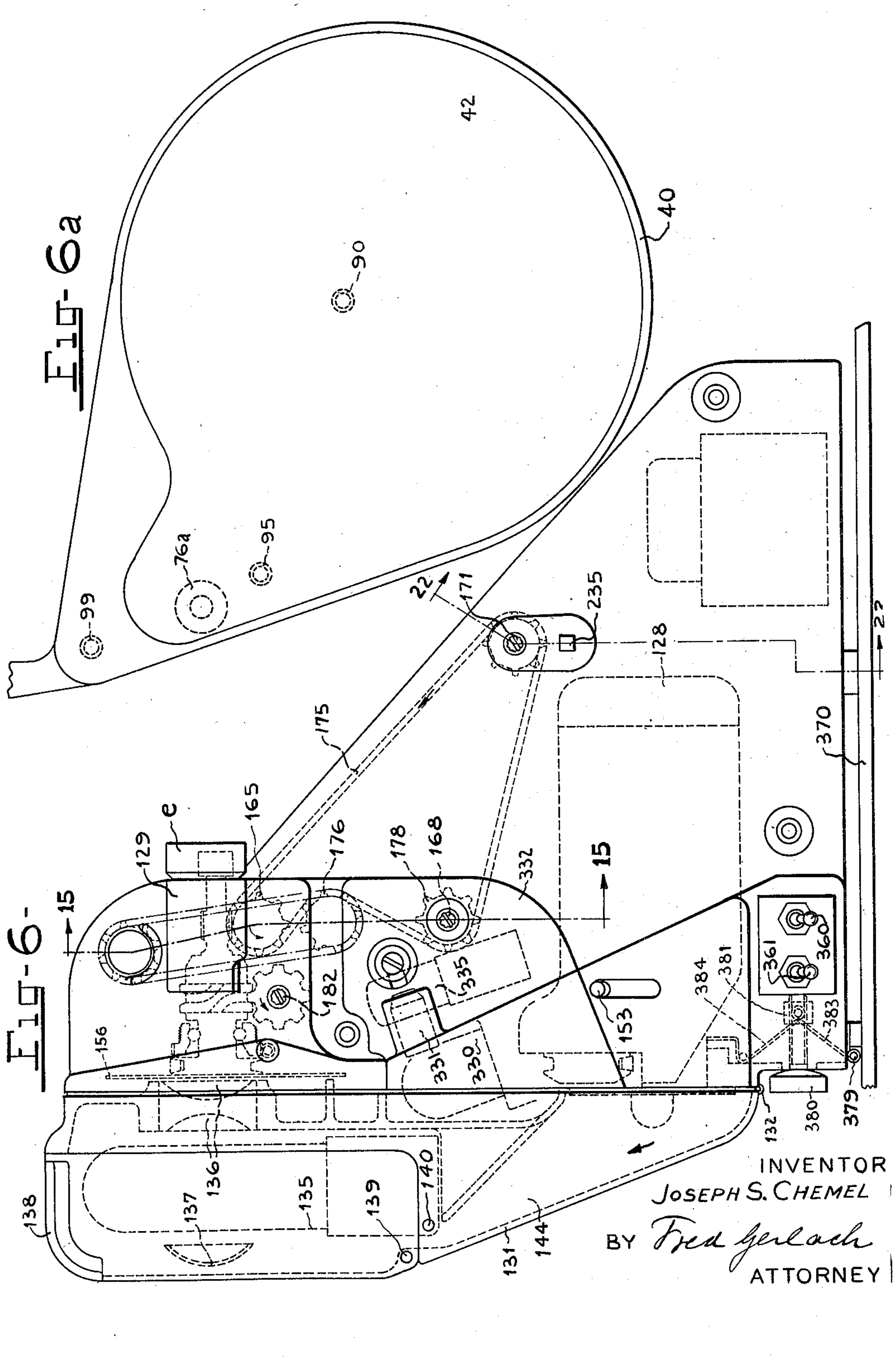
Fig. 6 is a side elevation of the projector unit, the holder for the magazine unit and the adapter-unit being removed.
Fig. 6a is a side elevation of the magazine unit.

The projector unit is mounted upon a door 370 which is hinged at 371 to a carrying case 372 into which the projector unit can be folded for transportation. Door 370 is provided with resilient pads 374. The base of the projector frame is secured on door 370 by bolts 375 with an interposed elastic pad 377 (Fig. 22) between said door and the projector frame. Door 370 is tiltable for varying the angle of optical projection at hinge 379 between the projector frame and said door, by a device which comprises a screw knob 380, a trunnion block 381, and hinge leaves 383 and 384, (Fig. 6).

When the magazine unit has been secured in and operatively connected to the projector unit, the driving mechanism on the projector unit will be coupled to the film feeding devices on the magazine unit; the roll of film *a* will be rotated by frictional engagement with the constantly driven rollers 63 which are driven by the coupled shaft 170 and the splined sleeve 90; sprocket drum 64 will feed the film between actuating member 69; drum 64 will feed the film through guide 68 on guide-plate 60 at one side of the roll of film and directed by guides 73 to one side of the projection gate; loop *a* will be formed in the upper portion of the gate and extend to the opposite side thereof in alignment with projection opening 54; the film will be directed between guides 73*b* and 73*d* across said opening and to the intermittent feed drum 74; drum 74 is then coupled to the intermittently operated spindle 180 of the driving mechanism in the projector unit and will intermittently advance the picture across the film opening; the film in the form of a loose loop will pass to guide roll 77, sound drum 76 and idler roller 78; sprocket drum 82 will then be continuously driven by shaft 167 and feed the film to the outer convolution of the rotating film *a*; between drum 82 and the roll of film, the latter will pass between wipers 87. In this manner, the pictures in the endless film in the magazine unit will be projected by the projection lens and lamp, while the film is fed from its inner convolution to its outer convolution.

The invention also provides for the use of the interchangeable use of projector unit for projecting pictures on an endless film in the magazine unit described, and for a film from a loaded reel to an empty reel. For this purpose, the magazine unit is replaceable by an adapter unit for projecting pictures on a film as it is wound on a take-up reel and fed from a supply reel.

Figures 1, 2, 3, 4, 5:
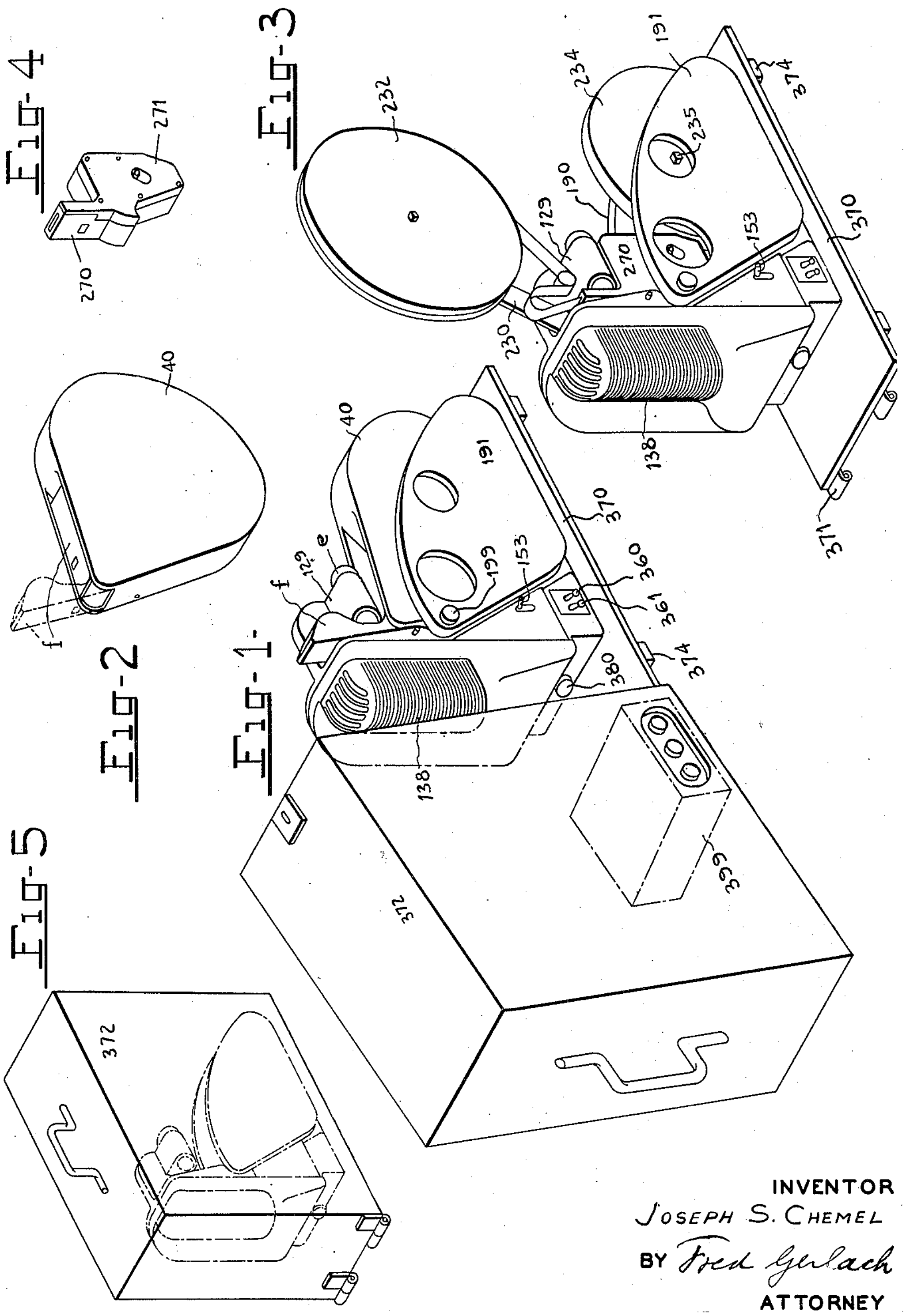
Fig. 1 is a perspective of the projector with the film magazine unit mounted in the projection unit, and the projector unit mounted on a hinged baseboard which form a part of a portable carrying case.
Fig. 2 is a perspective of the magazine unit for an endless film, separated from the projection unit.
Fig. 3 is a perspective of the projection unit with the adapter unit mounted therein for projection of a film carried by a supply spool and a take-up spool.
Fig. 4 is a perspective of the adapter unit for two-reel projection.
Fig. 5 is a perspective of the enclosing and carrying case for the projector.

An arm 230 (Fig. 3) is suitably supported on the projector frame for removably supporting a supply reel 232 for a film. A take-up spool or reel 234, disposed between holder-sections 190, 191, is supported by a spindle 235 (Figs. 21 and 22) which is square at its terminal end for driving said spool and is axially slidable in a sleeve 236 which is journalled in the housing 122 and held against axial movement therein by a snap ring 237, for shifting the inner end of spindle 235 into and out of engagement with take-up spool 234. A stud 238, provided at its outer end with a grip 243, is slidably mounted in a sleeve 239 and is connected to spindle 235 by a resilient clip 241 which extends into an annular groove at the outer end of spindle 235 and a thrust-ball 240 between said clip and spindle. Spring-pressed balls 242, carried by spindle 235, are adapted to snap into spool 234 to yieldingly retain it against axial movement on spindle 235. When the projector unit is being used with the magazine unit, spindle 235 is retracted into housing 122 and, for supporting the take-up spool 234, it is pushed inwardly and positioned by spring-pressed balls 247 for supporting the spool 234 in longitudinal alignment with the projection lens. The outer end of sleeve 239 is resilient and adapted to snap into grooves 244 at the inner and outer ends of button or grip 243 to yieldingly hold stud 238 and spindle 235 against axial movement in their alternative positions. The take-up spool 234, when mounted on spindle 235, is driven from sprocket 173 which drives the continuous feed shaft 170 by a pinion 246 on sleeve 172, and a gear 247 which meshes with pinion 246 and is fixed to the outer end of sleeve 236. A spring-pressed ball 248 in spindle 235 frictionally engages the cylindrical bore of sleeve 236 for yieldingly driving the take-up spool 234 when spindle 235 is engaged therewith. When spindle 235 is retracted and disengaged from spool 234, balls 248 are withdrawn from sleeve 236.

The splined shaft 170 is axially slidable in its drive sleeve 172 for coupling it to drive-sleeve 90 which drives drum 64 when the magazine unit is used and for that purpose is connected by a resilient clip 250 to the outer end of shaft 170 to a stud 251 which is slidably mounted in a sleeve 252 and provided with a button 253 at its outer end. Sleeve 252 is provided with a resilient outer end which is adapted to snap into annular grooves in stud 251 for yieldingly holding said stud and the shaft 170 in its operative and inoperative positions. When button 253 is pulled outwardly, the inner end of shaft 170 will be retracted into the sleeve 172 to provide clearance for the take-up spool 234, and when said button is pushed inwardly, shaft 170 will be positioned for engagement with the out-feed drum 64 of the magazine unit.

The projector unit is also provided with means for continuously feeding the film from a loaded spool 232, which comprises a shaft 256 (Figs. 15 and 16) which is journalled in the projector frame, a drum 257 fixed to one end of shaft 256, a sprocket wheel 258, a disk 259, and a washer 260 between said sprocket and disk. Sprocket wheel 258, disk 259 and washer 260 are secured on shaft 256 by a screw 261. An arcuate guide-shoe 263 holds the film in engagement with sprocket wheel 258 and is pivotally supported at 264 in a bracket 265 which is fixed to the housing 122. Shoe 263 is pivoted to permit the film to be threaded edgewise around drum 257 and said shoe. Drum 257 and sprocket wheel 258 on shaft 256 are adapted to be continuously driven by sprocket 266 fixed to shaft 256 within the projector frame 122; a sprocket 268 integral with sprocket 176, and a sprocket-chain 267 between sprockets 268 and 266.

The adapter unit (Figs. 33–44) is adapted to be placed between the holder-sections 190, 191 and is provided with devices for intermittently and continuously feeding the film between the condenser lenses in the projector unit and the projection lens and which is adapted to be coupled to the driving mechanism in the projector unit. The adapter unit comprises a housing which includes a body section 270 and a cover section 271 which form a housing for the film feeding and guiding mechanism of the adapter unit. The housing 270, 271 is adapted to fit between the holder sections 190, 191. An angle plate 269 (Fig. 33) of resilient metal is adapted to rest on the upper end of the back of the holder section 190, and the adapter housing rests against a resilient strip 272 (Fig. 7) for co-operatively positioning the feed devices in the adapter unit and the driving spindles carried by the projector unit.

The housing of the adapter unit includes an upward hollow extension 273 which extends between the projector lens and the condenser lenses 136 and is provided at its upper end with a slot 274 through which the film passes from the feed drum 257. A projection opening 275 is formed in the front and rear walls of extension 273. Spring-pressed guides 290, 291 are confined in extension 273 for directing the film downwardly to an intermittent feed sprocket drum 277. Guide 291 is hinged at 296. Resilient strip 297 moves guide 291 away from sprocket 277. Resilient strip 292 returns guide 290 toward sprocket 277. Guide 307 serves as guide between roll 299 and drum 278. Resilient member 311 presses against guide 310. Drum 277 is journalled on a sleeve 282 which is fixed in the body section 270 of the adapter housing and is fixed to a splined sleeve 283. Sleeve 283 is adapted to be coupled to the spindle 180 of the driving mechanism of the projector unit. The lower portion of guide 290 is arcuate and provided with a resilient strip 294 for directing the film around the drum 277. From drum 277, the film passes around a cylindrical member 302 in the body section 270 and in a loose loop within a guide 305, hinged at 306 to the sound drum 278. Drum 278 is journalled on a sleeve 279 which is fixedly secured in section 270 of the adapter housing on an anti-friction bearing 284 and comprises a cap 285 which is adapted to be engaged by shaft 205 (Fig. 18) of the fly wheel 207 in housing 122. A guide roll 299, journalled in a frame 300 which is pivoted at 301 in housing section 270, is pressed against the film on drum 278 by a spring 303 on said frame. Guide 305 has a snap engagement at 304 with frame 300. From drum 278, the film passes to an idler roll 308 which is journalled in the housing section 270. The film is held around the idler roll 308 by a guide 309, which, in co-operation with a guide 310, directs the film to the continuous out-feed sprocket drum 280. Drum 280 is journalled on a sleeve 287 (Fig. 35) which is fixedly secured in the housing section 270 and is secured to a splined sleeve 288. Sleeve 288 is adapted to receive and to be coupled to the continuously driven spindle 167 of the driving mechanism on the projector. From drum 280, the film is directed by an arcuate guide 312 to an idler roll 313 which is journalled in the housing section 270. From idler roll 313, the film passes to the take-up spool 234.

A releasing plate 350 (Figs. 35 and 41) is slidably confined between the body section 270 and the cover section 271 of the adapter casing, for releasing the pressure of guide roll 299 on the film and the guide 312 around the continuous sprocket drum 280. A stud 351 on plate 350 projects through a slot in cover section 271 for shifting plate 350 for this purpose and is provided with a pair of slots 352, 353 for slidably guiding plate 350 on studs 354 which are formed on the cover section 271 of the adapter casing. Plate 350 is provided with an abutment 356 which is adapted to engage the film guide 293 to move said guide away from intermittent sprocket drum 277; and with a cam-abutment 357 which is adapted to engage the guide 305 and cause its lower end to release guide roll 299 from sound drum 278, and with an abutment 358 for engaging and spreading apart guides 310, 312 when plate 350 is manually shifted downwardly. When plate 350 has been shifted, the film may be manually fed and guided around the feed devices in the adapter casing. This facilitates the threading of the film through the mechanism in the adapter casing. When plate 350 is raised, the film guides will be spring-pressed into their operative position, provided that the film perforation engages the sprocket teeth. Pulling on either ends of film will cause alignment of sprocket holes and sprocket teeth. Projection 295 (Fig. 39) retains guide 293 about sprocket drum 277.

The operation of the projector with the adapter unit will be as follows: the film will be threaded from drum 257 and through the adapter unit; reel 232 will be mounted on arm 230; reel 234 will be mounted on spindle 235 which will be pushed inwardly to support said reel. The adapter unit will be placed in the holder sections 190, 191, while it is positioned away from housing 122; the holder will then be operated to shift the adapter unit laterally into co-operative relation with the projector unit. Sleeve 288 of sprocket drum 280 will then be coupled with shaft 167. Spindle 180 of the driving mechanism of the projector unit will be coupled to the splined sleeve 283 of the intermittent sprocket drum 277. Sound drum 278 will be coupled to fly wheel shaft 205. The adapter unit will then be operatively connected to the projector unit for driving the feeding devices in the adapter unit from the driving mechanism in the projector unit for intermittently advancing the film across the projection opening 275.

The sound reproducing system is adapted to be controlled by a sound track on one margin of the film and comprises an exciter lamp 330 (Figs. 6, 18 and 19) which is enclosed in housing 332 and projects light through a condenser 331 to transmit a beam of light through the sound track on the film, to a mirror 333 which reflects the projected light to a photo-electric cell 335 for reproduction of audio-frequencies, as well understood in the art. When the magazine unit is used, the beam of light passes through an opening 107 in sleeve 105 on which the sound drum 76 is journalled and an orifice 106 in the magazine housing (Fig. 28). When the adapter unit is used, the beam of light passes through an opening 338 in sleeve 279 on which sound drum 278 is journalled, and an opening 337 in the adapter housing (Fig. 35).

The invention contemplates the use of electronic apparatus for audio frequencies from the sound track on the film in the projector and transmitting the sound to an ordinary or home radio receiving set, for reproduction. This apparatus is preferably included in a housing 399 which may be conveniently mounted in the projector case 372.

The electric circuits and equipment for sound transmission in this manner are illustrated in Fig. 42. These include an A. C. power line 401; a transformer 400 for selectively supplying current of the desired voltage to the system; tube 403 for rectifying alternating current to continuous pulsating current; amplifying tubes 405, 406 for re-inforcing the signals from the photo-cell 335 of the projector; a transmitter set 408, including a tube 407 for supplying rectified current to the pentagrid-converter-oscillator-detector tube 409 which converts the current into an electro-magnetic wave and propagates the waves; a transformer 411, of variable output, controlled by variable condenser 412, for varying the voltage to the plate of the oscillator tube 409; an adjustable quartz crystal 415 by which the propagated wave lengths can be varied; a transmitting aerial 417, and the other elements and circuits diagrammatically indicated in Fig. 42. The transmitter unit 408 is coupled to the amplifying unit by matched impedance couplings 416. The propagated electro-magnetic or radio wave is intercepted by tuning of the usual home radio receiving set to the particular wave length transmitted, so that the sound production originating at the film and converted into audio frequencies and electro-magnetic waves will be reproduced by the radio set with which homes are usually equipped. This exemplifies sound reproduction means by which equipment associated with the projector and responsive to the sound track on the film being projected, can be exemplified, received, and reproduced by the usual radio receiver set.

The invention is not to be understood as limited to the details described, since these may be modified within the scope of the appended claims without departing from the spirit and scope of the invention.

Having thus described the invention, what I claim as new and desire to secure by Letters Patent is:

1. Motion picture apparatus comprising: a projector including a supporting frame, optical projection means, and mechanism mounted in the frame for intermittently and continuously driving film feed devices; a demountable unit, including a housing for a film and devices mounted in the housing for continuously and intermittently feeding the film for optical projection; a holder, slidably supported at one side of the frame, and in which the unit is demountably supported; detachable connections between the feed devices in the magazine and the driving mechanism on the supporting frame, and means for slidably supporting the holder to engage and detach the connections between the magazine and the driving mechanism on the projector frame.

2. Motion picture apparatus comprising: a projector including a supporting frame, optical projection means, and mechanism mounted in the frame for intermittently and continuously driving film feed devices; a demountable unit, including a housing for a film and devices mounted in the housing for continuously and intermittently feeding the film for optical projection; a holder, slidably supported at one side of the frame, and in which the unit is demountably supported, means for resiliently supporting the unit in the holder, detachable connections between the feed devices in the magazine and the driving mechanism on the supporting frame; and means for slidably supporting the holder to engage and detach the connections between the magazine and the driving mechanism on the projector frame.

3. Motion picture apparatus comprising: a projector including a supporting frame, optical projection means, and mechanism mounted in the frame for intermittently and continuously driving film feed devices; a demountable unit, including a housing for a film and devices mounted in the housing for continuously and intermittently feeding the film for optical projection; a holder, including separable sections, slidably supported at one side of the frame, and in which the unit is demountably supported; detachable connections between the feed devices in the magazine and the driving mechanism on the supporting frame; and means for slidably supporting the holder to engage and detach the connections between the magazine and the driving mechanism on the projector frame.

JOSEPH S. CHEMEL.

REFERENCES CITED

The following references are of record in the file of this patent:

UNITED STATES PATENTS

| Number | Name | Date |
|---|---|---|
| Re. 22,707 | McMahon | Jan. 15, 1946 |
| 929,743 | Wooden | Aug. 3, 1909 |
| 1,352,420 | Albers | Sept. 14, 1920 |
| 1,372,675 | Davis | Mar. 29, 1921 |
| 1,535,795 | Seufert | Apr. 28, 1925 |
| 1,732,755 | Kerestes | Oct. 22, 1929 |
| 1,760,219 | Thornton | May 27, 1930 |
| 1,821,946 | Owens | Sept. 8, 1931 |
| 1,839,132 | Thornton | Dec. 29, 1931 |
| 1,859,665 | Golden et al. | May 24, 1932 |
| 1,943,305 | Foster | Jan. 16, 1934 |
| 1,989,166 | Day | Jan. 29, 1935 |
| 2,023,581 | Glunt | Dec. 10, 1935 |
| 2,103,766 | Cahill | Dec. 28, 1937 |
| 2,135,996 | Wood | Nov. 8, 1938 |
| 2,151,742 | Cazes | Mar. 28, 1939 |
| 2,196,736 | Merriman | Apr. 9, 1940 |
| 2,206,134 | Streychmans | July 2, 1940 |
| 2,214,468 | Lannerd | Sept. 10, 1940 |
| 2,217,036 | Williams | Oct. 8, 1940 |
| 2,238,719 | Detartas | Apr. 15, 1941 |
| 2,279,022 | Duskes | Apr. 7, 1942 |
| 2,351,088 | Wilson et al. | June 13, 1944 |
| 2,427,585 | Williams | Sept. 16, 1947 |
| 2,434,200 | Engelken | Jan. 6, 1948 |

FOREIGN PATENTS

| Number | Country | Date |
|---|---|---|
| 746,448 | France | Mar. 7, 1933 |